Aug. 18, 1931.  A. C. WATSON  1,819,217
APPARATUS FOR PRODUCING VISUAL EFFECTS
Filed Aug. 27, 1929  2 Sheets-Sheet 1
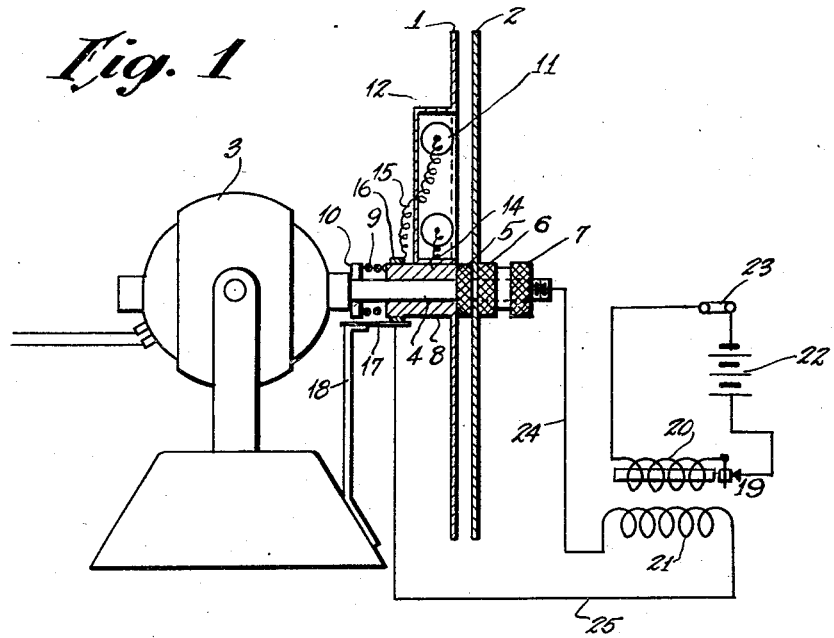
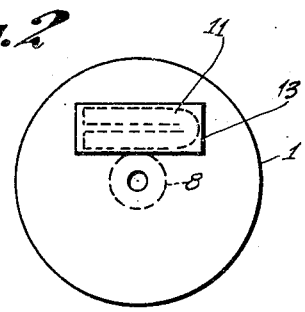
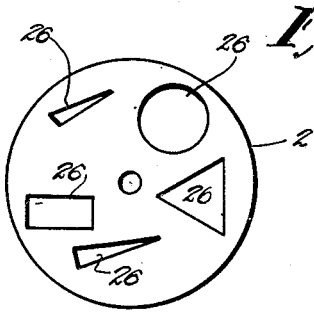
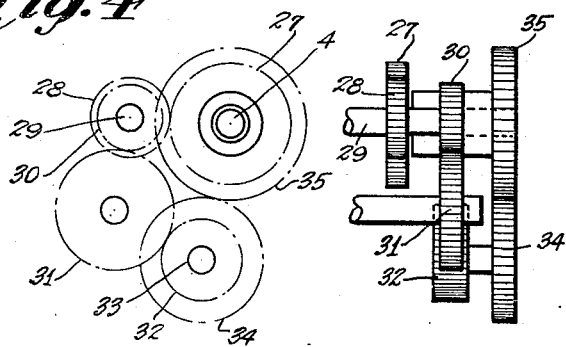
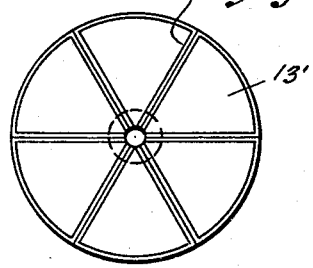
INVENTOR.
Arthur C. Watson
BY James L. Stewart
ATTORNEY.

Patented Aug. 18, 1931

1,819,217

UNITED STATES PATENT OFFICE

ARTHUR C. WATSON, OF MARIETTA, OHIO

APPARATUS FOR PRODUCING VISUAL EFFECTS

Application filed August 27, 1929. Serial No. 388,811.

This invention relates to apparatus for producing visual effects and is directed more particularly to apparatus whereby substantially instantaneous intermittent illuminations are caused to rapidly occur along a periodic path in rapid succession through repetitive cycles with sufficient rapidity of repetition of these cycles to satisfy the critical frequency for continuous visual sensation, and which apparatus preferably includes a mask so associated with a source or sources of illumination that there occurs a relative movement between said members along said path for the purpose of producing optical effects in the nature of light patterns or letters, words, symbols or combinations thereof.

While the invention is susceptible of various practical embodiments, it comprises, in one of its preferred forms, a source of instantaneous light of relatively small dimensions. This source of light is mounted to rotate in a circular path about a fixed axis. One or more neon tubes may be conveniently utilized as a source of light and the neon tube or tubes as they are rotated about said fixed axis are intermittently energized to give substantially instantaneous intermittent illuminations of substantially constant frequency. The rate of rotation of the neon tube is preferably also constant, so that there results successive intermittent illuminations in different positions progressively along the circular path of rotation in rapid succession and at such speed of rotation as to satisfy the critical frequency for continuous visual sensation. Positioned between this moving source of light and the observer is a mask which, in practice, is preferably formed with light penetratable portions while other portions to the mask are opaque. This mask may be stationary or movable, but is preferably movable at a speed of rotation coaxial of the center of rotation of the source of light and at a different speed than the speed of movement of the source of light. The relative speeds may in practice be either varying or constant and they may depend upon either frictional or positive drive between the parts. Gearing connections to produce a definite ratio in speed between the source of light and the mask are found to give excellent results.

The foregoing exemplary structure is advanced for the purpose of illustration only and the broad principles of the apparatus of this invention may partake of other practical forms as will hereinafter be more specifically described. Moreover, features of the invention, other than those specified, will be apparent from the hereinafter detailed description and claims when read in conjunction with the accompanying drawings.

The accompanying drawings embody different practical embodiments of the invention, but the constructions therein shown are to be understood as illustrative, only, and not as defining the limits of the invention.

Figure 1 is a side elevation of apparatus embodying the present invention showing certain parts in central section and the wiring connections in the form of a diagram.

Figure 2 is a front view of a movable member which carries the source of light in the construction of Figure 1.

Figure 3 is a front view of the mask shown in Fig. 1.

Figures 4 and 5 are respectively side and edge elevations of a gear train which may be interposed between the relatively movable light carrying member and mask to control their relative speeds of rotation.

Figure 6 is a front view of a modified form of light carrying member.

Figure 7:
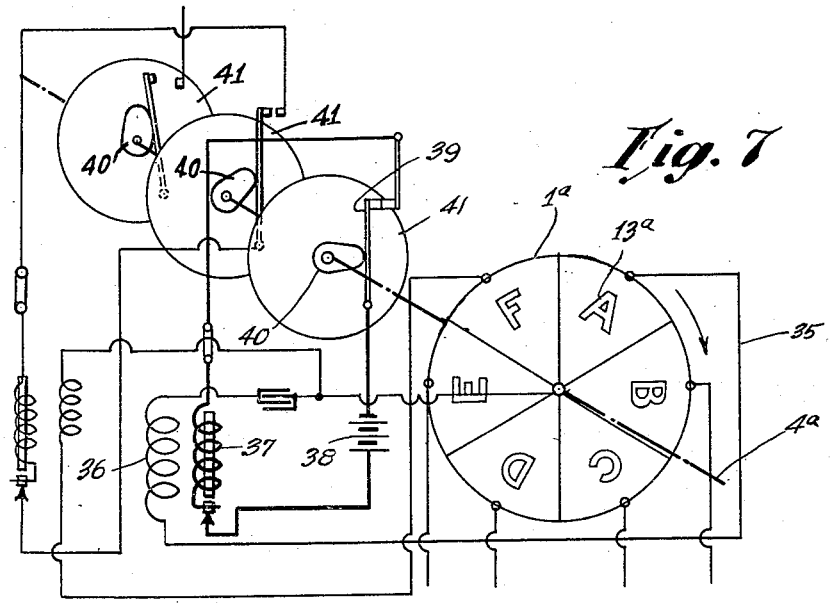
Figures 7 and 8 show modified forms of the invention in a diagrammatic manner.

Referring to Fig. 1 of the drawings, 1 and 2 designate two disks, which are adapted to be rotated upon a common axis in parallel planes and in relatively close spaced relation. Any suitable source of power may be utilized to drive these disks, but in the preferred practical form, they are adapted to be rotated by an electric motor 3, on the armature shaft 4 of which the respective disks are mounted for rotation.

As shown in Fig. 1, the outer end of the armature shaft is threaded and on to this threaded end is screwed a collar 5. The disk 2, which constitutes the mask as hereinafter more fully described, is thereupon passed over the end of the shaft and clamped tightly against the collar 5 by a nut 6 and a lock nut 7 is thereupon screwed upon the shaft to secure the parts against inadvertent release. In this manner, the mask 2 is mounted fixedly upon the shaft 4 to be driven thereby in a positive manner. The disk 1 is provided with a hub 8 which finds a bearing on the shaft 4 between the collar 5 and the motor and the spring 9 is interposed between an adjustable collar 10 and the hub 8, so as to force the hub into frictional engagement with the collar 5 whereby the disk 1 is driven through such frictional engagement.

By adjusting the collar 10, the compression of the spring 9 is regulated to vary the frictional engagement between the parts as stated in order to obtain the approximate relation of speed desired under particular conditions of operation.

The disk 1 constitutes a carrier for a source of light shown in Figs. 1 and 2 as embodying a single neon tube 11 mounted within a suitable housing 12 carried by said disk. The front of the housing is cut away as at 13 to provide a sight opening through which the source of illumination may be viewed from the front of the disk. In practice a single neon tube may be used as stated or a number of these tubes may be used in a cluster or there may be a plurality of tubes arranged in different positions circumferentially of the disk 1. However, in Fig. 2, a single tube is shown. One terminal of the tube is electrically connected with respect to the shaft 4 as indicated in Fig. 1. The other terminal of the tube is electrically connected as indicated at 15 in this figure to a collector ring 16 mounted on the hub, and a wiper 17 mounted in stationary position on the bracket 18 engages with the collector ring as shown.

The reference character 19 designates, generally, a spark coil embodying the usual primary and secondary windings 20 and 21, respectively an appropriate vibrator or interrupter as shown. The circuit of the primary coil includes a battery 22 and a suitable switch, whereby the flow of current through this circuit may be controlled. The secondary winding 21 is electrically connected to the shaft 4 as indicated at 24, while the other terminal of this winding is electrically connected as indicated at 25 to the wiper 17, so that when the switch 23 is closed, the neon lamp 11 will be intermittently energized at a constant frequency.

The motor 3 is energized from any suitable source of current to operate preferably at a uniform speed although in practice the speed may be variable without departing from this invention.

With the arrangement as shown, it will be apparent that when the motor is energized, the mask 2 will be positively driven and will rotate at a speed corresponding to the speed of operation of the motor, whereas the disk 1 will be frictionally driven with accompanying slippage due to the inertia of the disk 1 and its greater resistance to rotation. There will thus result a different speed of rotation of the disks 1 and 2. If it be assumed that the disk 2 is removed, an observer looking at the disk 1 while stationary will see the single source of light in stationary position at the opening 13 as it appears in Fig. 2. However, if the disk 1 is rotated at relatively high speed, the rectangular outline or contour of the opening 13 will no longer be apparent and if this speed is such as to satisfy the critical frequency of continuous visual sensation, there will appear to the observer a continuous ring or zone of light. This circle of light will be made up of a great number of instantaneous intermittent flashes of the neon tube timed according to the frequency of illumination of the tube and occurring in rapid succession throughout the entire path of travel of the tube about the axis of the shaft 4. However, as the speed of rotation, as well as the frequency of illumination of the tube is so great that the instantaneous flashes of the neon tube in successive positions along its path cannot be selectively discerned and as a result the visual sensation of a continuous ring of light is obtained.

Now if the mask 2 is rotating in front of the disk 1, i. e., between the observer and the light, various light penetratable portions 26 formed in said mask, which is otherwise opaque, will cooperate to produce a pattern of light, the shape of which pattern or patterns will depend upon the shaping of the light penetratable portions 26, the speed of rotation of the source of light, the relative speeds of rotation of the two disks and the frequency of the light source. According to this invention, the light penetratable portion 26 are shown in different geometrical forms for the purpose of producing æsthetic designs, but it will be understood that these portions may be otherwise shaped without departing from this invention.

Furthermore, the forward face of the mask may be of mottled colors or different portions of such face may be painted in different colors, so that as the mask is viewed during its operation, there is impressed upon the eye of the observer a combined design embodying the patterns resulting from light transmitted directly from the light source together with patterns resulting from the action of reflected light upon the colored forward face of the mask. Some very beautiful effects may be produced through this combination of directly transmitted and reflected light, but the present invention is not limited to the use of reflected light in this connection.

In the structure of Fig. 1, as hereinbefore described, the source of light is frictionally caused to rotate about the axis of the driving shaft. It is within the purview of this invention, however, to drive the disks 1 and 2 at predetermined relative speeds. This may be accomplished to produce highly practical results by the gearing shown in Figs. 4 and 5.

When this arrangement is used, in practice, I preferably employ the following gear train.

On the shaft 4 between the motor casing and the hub 8 is fixed a gear 27 having, for example eighteen teeth. The gear 27 meshes with and drives a gear 28 fixed on a counter shaft 29 to which is also fixed a gear 30. The gear 28 has fourteen teeth and the gear 30 has thirteen teeth. This gear 30 meshes with an idler 31 on another counter shaft. The idler 31 may have any appropriate number of teeth but eighteen is found convenient. The idler 31 meshes with the gear 32 having fifteen teeth and carried by a third counter shaft and this latter counter shaft 33 also carries a gear 34 having eighteen teeth. The gear 34 meshes with a gear 35 rigidly secured to the rear end of the hub 8 and having twenty teeth. In this practical embodiment of the invention, when the armature shaft of the motor is rotating at 1750 R. P. M. and the mask 2 consequently operated at the same speed, the light disk 1 will be operated at a speed of 1754. In other words, the light disk is operated four revolutions per minute faster at the speeds given. Highly satisfactory practical results are obtained under these conditions although multiples of these speeds have also been practiced with thoroughly satisfactory results.

In Figs. 1 and 2, a single neon tube is shown, this source of light occupying in effect one segmental portion of the area to be illuminated. This source of light may in practice constitute a neon tube or any other suitable source of light which functions in an equivalent manner. One or more tubes may be used as stated back of the opening 13, but it is desirable in any event that the light be substantially uniform throughout the extent of the opening 13, and in order to produce this result I preferably associate with the opening suitable means for diffusing the light throughout the extent of the opening. A suitable translucent window may be employed for this purpose, although in certain constructions, which I have already made, I have embedded the tube in paraffine the whole body of which paraffine is illuminated when the tube is energized and from this body the light emanates with a well distributed glow. The opening 13 is shown in Fig. 2 as substantially rectangular, but in practice it may be of any other suitable shape. Furthermore, a number of such openings may be disposed about the area to be illuminated. Thus, as shown in Fig. 6, the area to be illuminated is practically covered by six separate and distinct sources of light arranged back of six segmentally shaped openings 13'. The result of this arrangement is that there are six distinct sources of illumination arranged about the axis of rotation in consecutive relation. These several sources of illumination may, if desired, all be illuminated simultaneously or they may be illuminated in rapid sequence. Furthermore, the whole surface of the disk 1 may constitute in practice for some particular uses, a source of light. However, in Fig. 7, I have shown an arrangement such as illustrated in Fig. 6, wherein the several sources of light are disposed circumferentially about the surface to be illuminated and are adapted to be successively energized in timed relation to one another to e. g., spell out words, as in advertising.

In Fig. 7, the disk 1a which corresponds to the disk 1 has arranged about its face in annular succession light penetratable portions 13a which are respectively shaped to simulate letters of the alphabet. Six such letters are shown, although in practice any number, such as twenty-six letters may be disposed about the center in the manner specified. Back of each letter is a source of illumination, such as a neon light, and the various lights have each associated therewith an electrical circuit to control their energization selectively. An electric circuit is shown complete associated with the segment bearing the light penetratable portion in the shape of the letter A, but it will be understood that the arrangement shown is duplicated for each of the other letters. The lamp back of A is included in a circuit 35 which constitutes a secondary circuit of an induction coil and includes a secondary winding 36. The primary winding 37 includes a source of electrical energy 38 and also includes an interrupter switch 39 which is adapted to be actuated by an interrupter cam 40. This cam is mounted on the shaft which carries the disk 1a, the axis of the shaft being designated 4a. The timing switch or circuit breaker 39 is mounted upon a plate 41 which is circumferentially adjustable to advance or retard the time of making and breaking the primary circuit through the action of the cam 40 which is rotating with the shaft and disk 1a. By properly adjusting or regulating the plate 41 to cause timing at the proper predetermined instant, a light will be flashed back of the letter A when this letter is in the corresponding predetermined position. If the other several letters on the disk are energized in the same manner by like mechanism suitably timed, it will be apparent that through each complete rotation of the disk letters may be caused to flash in any predetermined sequence and in any predetermined positions and if this cycle is repeated with sufficient rapidity, to satisfy the requirements of continuous visual sensation, it will be manifest that there will be impressed upon the eye the aggregate of the numerous light flashes entering into this operation, and a word may be spelled in its entirety in the manner specified, the entire word being visible at one time, although composed of separately energized letters, energized at different times but in such relative positions as to give the optical effect of the complete word.

The arrangement referred to with reference to Fig. 7 is susceptible of various adaptations as will be immediately apparent to those skilled in the art. Letters, words, symbols or motifs of a pattern, or combinations thereof, may be operated in the manner stated and timed to produce the desired optical impression with or without a mask as the desired results will dictate.

Figure 8:
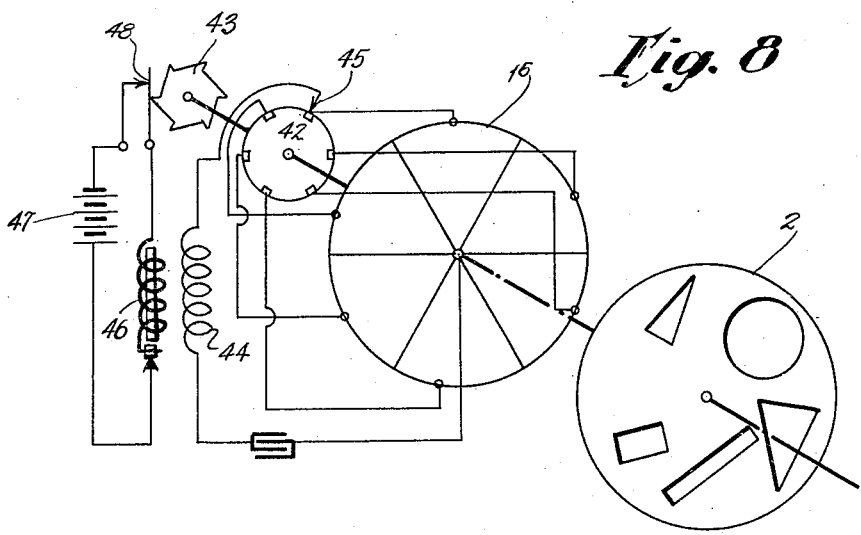

In the construction shown in Fig. 8, the disk 1b is of the character shown in Fig. 6, but is mounted in stationary position with a mask 2 rotating in front of it and with a commutator 42 and circuit breaker 43 rotating with the mask. The several sources of illumination of the disk 1b are adapted to be placed in circuit with the secondary winding 44 of the induction coil by means of the commutator 42 which embodies a brush or wiper 45 under which the several conductor sections of the commutator are adapted to successively pass to complete the circuits through the several sources of light in succession. The primary winding 46 is included in a circuit which includes the source of electrical energy 47 and breaker points 48 operated by the breaker 43 rotating with the commutator. The mask 2 is driven, for example, as described in Fig. 1 by a suitable motor and the commutator and interrupter rotate in timed relation thereto so as to cause the sources of illumination of the disk 1b to be flashed successively in rapid sequence in order to produce appropriate visual effects upon the eye of the observer forwardly of the apparatus.

I have hereinbefore referred to the means for mounting the light disk and mask as embodying an electric motor for positively driving at least one of these parts, and in practice this type of prime mover gives highly satisfactory results. I wish it understood, however, that the invention is not limited in this connection and that any source of power may function as a prime mover to drive the parts as stated whether it be mechanical, electrical or otherwise.

I have also particularly described the source of light as one or more neon tubes. These tubes have given highly satisfactory results in the apparatus which I have built. I wish it understood, however, that, in all probability, other forms of non-filament tube might function satisfactorily if used in the same way and the invention is therefore to be understood as not limited expressly to the use of a neon tube or tubes but that equivalents may be used in this connection. Furthermore, while I have shown geometrical patterns and alphabetical forms in connection with the mask, these shapes are to be understood as not restricted to the shapes of the light penetrable portions with which such mask may be provided.

The apparatus which I have described has been used in practice in connection with the art of advertising. I am aware, however, that it may be used for other purposes. Accordingly the present invention is to be understood as fully commensurate with the appended claims.

Having thus fully described the invention, what I claim as new and desire to secure by Letters Patent is:

1. An apparatus of the character described embodying a source of light capable of emitting substantially instantaneous flashes of light when intermittently energized, means for intermittently energizing said source of light, means for moving said source of light about an axis of rotation at a speed satisfying the critical frequency of continual visual sensation, and a mask having light penetrable portions positioned forwardly of said source of light, and with respect to which the source of light is relatively rotatable.

2. Apparatus of the character described embodying a source of light capable of emitting substantially instantaneous flashes of light when intermittently energized, means for intermittently energizing said source of light, means for moving said source of light about an axis of rotation at a speed satisfying the critical frequency of continuous visual sensation, and a mask having light penetratable portions positioned forwardly of said source of light, and with respect to which the source of light is relatively rotatable, at least a portion of the forward face of the mask being colored.

3. Apparatus of the character described embodying a source of light capable of emitting substantially instantaneous flashes of light when intermittently energized, means for supporting said source of light for rotation, a mask having light penetratable portions positioned forwardly of said source of light and mounted for coaxial rotation with respect thereto, means for intermittently energizing said source of light, and means for rotating said light source and mask in the same direction and at different speeds.

4. Apparatus of the character described embodying a source of light capable of emitting substantially instantaneous flashes of light when intermittently energized, means for supporting said source of light for rotation, a mask having light penetratable portions positioned forwardly of said source of light and mounted for coaxial rotation with respect thereto, gearing connections between the source of light and the mask for controlling their relative rotation, and means for rotating both of them at speeds satisfying the critical frequency of continuous visual sensation.

5. Apparatus of the character described embodying a segmentally arranged source of light supported to rotate about a fixed axis and capable of emitting substantially instantaneous flashes when intermittently energized, means for intermittently energizing said source of light, means for rotating said source satisfying the critical frequency of continuous visual sensation, and a mask having light penetratable portions positioned forwardly of said source of light.

6. Apparatus of the character described embodying a segmentally arranged source of light supported to rotate about a fixed axis and capable of emitting substantially instantaneous flashes when intermittently energized, means for intermittently energizing said source of light, means for rotating said source satisfying the critical frequency of continuous visual sensation, a mask having light penetratable portions positioned forwardly of said source of light, and means for rotating said mask at a different speed from the speed of rotation of the source of light.

7. Apparatus of the character described embodying a plurality of sources of light arranged in an annular relation about a central point, each of said sources of light being capable of emitting substantially instantaneous flashes of light when intermittently illuminated, means for intermittently energizing said sources of light in rapid succession, and a mask positioned forwardly of said sources of light and having light penetratable portions.

8. Apparatus of the character described embodying a plurality of sources of light arranged in an annular relation about a central point, each of said sources of light being capable of emitting substantially instantaneous flashes of light when intermittently illuminated, means for intermittently energizing said sources of light in rapid succession, a mask positioned forwardly of said sources of light and having light penetratable portions, and means for rotating said mask.

9. A plurality of letters of the alphabet mounted to move along a predetermined path, means for illuminating said letters individually, said illuminating means being capable of producing substantially instantaneous illumination of the letters individually when said means is intermittently energized, and means for intermittently energizing said illuminating means to illuminate predetermined letters in predetermined sequence and when in predetermined positions of their travel.

10. Apparatus of the character described embodying a source of light capable of emitting substantially instantaneous flashes of light when intermittently energized, means for supporting said source of light for rotation, a mask having light penetratable portions positioned forwardly of said source of light and mounted for coaxial rotation with respect thereto, means for intermittently energizing said source of light, and means for rotating said light source and mask in the same direction but at a ratio of speed of 1750 revolutions of the mask to 1754 revolutions of the light source.

Signed by me at Marietta, Ohio, this 24th day of August, 1929.

ARTHUR C. WATSON.